United States Patent
Fehring

(10) Patent No.: US 6,536,574 B2
(45) Date of Patent: Mar. 25, 2003

(54) ADJUSTABLE CENTRIFUGAL CLUTCH

(76) Inventor: Thomas C. Fehring, 5167 Michael Anthony La., Cincinnati, OH (US) 45247

( * ) Notice: Subject to any disclaimer, the term of this patent is extended or adjusted under 35 U.S.C. 154(b) by 0 days.

(21) Appl. No.: 09/894,931

(22) Filed: Jun. 28, 2001

(65) Prior Publication Data

US 2001/0045336 A1 Nov. 29, 2001

Related U.S. Application Data

(63) Continuation-in-part of application No. 09/489,071, filed on Jan. 21, 2000, now Pat. No. 6,279,711.

(51) Int. Cl.[7] .......................... F16D 43/10; F16D 13/75
(52) U.S. Cl. ................ 192/105 C; 192/110 R
(58) Field of Search ................. 192/105 C, 105 CS, 192/103 A, 110 R, 70.23, 70.24

(56) References Cited

U.S. PATENT DOCUMENTS

| 2,038,038 A | 4/1936 | Gregg |
| 2,055,177 A | 9/1936 | Lyman |
| 2,780,335 A | 2/1957 | Hubbard |
| 2,802,370 A | 8/1957 | Benzin |
| 3,291,274 A | 12/1966 | Wyman |
| 3,769,905 A | 11/1973 | Dishcler |
| 4,111,291 A | 9/1978 | Horstman |
| 4,296,852 A | * 10/1981 | Luerken .............. 192/105 CD |
| 4,856,637 A | 8/1989 | Gebhart |
| 5,070,984 A | 12/1991 | Fehring |
| 5,284,234 A | 2/1994 | Miglizzi |
| 5,361,882 A | * 11/1994 | Tipton .................... 192/105 C |
| 5,638,935 A | 6/1997 | Fehring |
| 5,967,286 A | 10/1999 | Hokanson et al. |

* cited by examiner

Primary Examiner—Rodney H. Bonck
(74) Attorney, Agent, or Firm—Wood, Herron & Evans, L.L.P.

(57) ABSTRACT

A kinematically simple centrifugal clutch to minimize frictional induced hysteresis. The centrifugal clutch includes a rotatable output driven member, two drive plates, and at least one clutch disc disposed adjacent to the drive plates. A drive hub is adapted to receive a rotational input such as that from an output shaft of a motor. Two weighted members are pivotally mounted to the drive hub. Two spring members are operative between the drive hub and the weighted member to apply a restoring force to the weighted members. Under the influence of centrifugal force generated by the rotation of the drive hub, the weighted members pivots against the resistance of the spring member so as to engage the drive plates and thereby urge the drive plates into engagement with the clutch disc such that the driven member rotates with the drive plates.

12 Claims, 5 Drawing Sheets

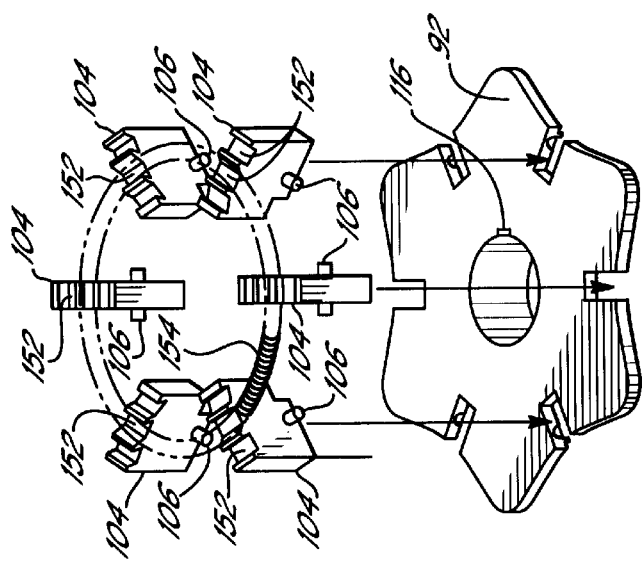
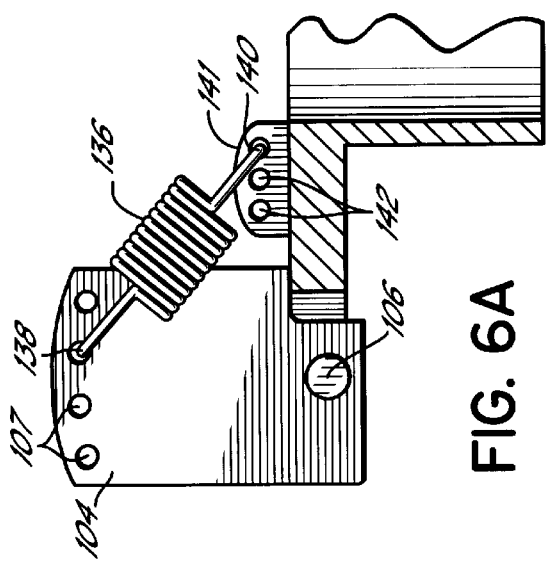
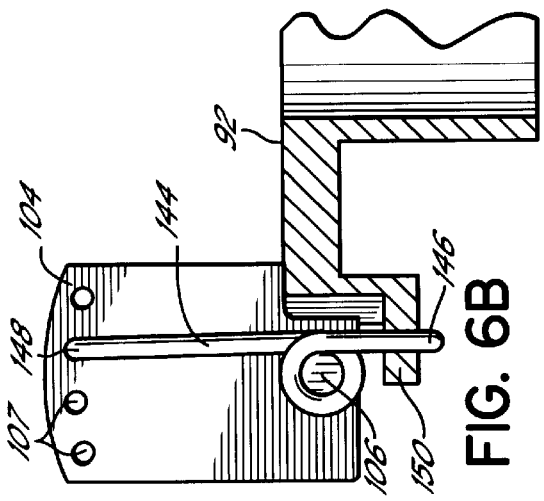

ADJUSTABLE CENTRIFUGAL CLUTCH

This application is a continuation-in-part of application Ser. No. 09/489,071, filed Jan 21, 2000, now U.S. Pat. No. 6,279,711.

FIELD OF THE INVENTION

This invention is directed to clutches, and more particularly to centrifugal clutches.

BACKGROUND OF THE INVENTION

Centrifugal clutches are well known in the art. In essence, these devices, sometimes known as frictional contact axial clutches, utilize mating frictional members to transfer torque from an input shaft to an output shaft. This is accomplished by harnessing the effects of centrifugal force upon pivoted weights to generate axial movement and ultimately axial thrust. This axial thrust is applied upon an output frictional member which, by interacting with an input shaft frictional member, effectively transmits the input shaft torque to the output or driven shaft.

In one such type of clutch, weights are attached to a support disc which is mounted for rotation with a rotating input shaft. The weights are mounted to pivot about an axis perpendicular to the rotational axis of a support disc. The weights are spring biased to a non-engaging position relative to a clutch plate. As the angular speed increases, the weights pivot as the centrifugal force of the pivoting weights overcome the force generated by the springs and engage the clutch plate. With increasing angular speed, the weights pivot more and the clutch plate engages a clutch disc which is splined to an output drum. The plurality of springs which are operative between the support disc and the clutch plate pull the clutch plate toward the support disc. Thus, as the angular speed decreases, the springs push against the pivoted weights to restore the weights to their non-engaging, i.e., non-pivoted, position. Consequently, the clutch plate disengages the clutch disc such that the output drum is not actively driven.

There are several disadvantages associated with the type of clutch described above. One particular problem associated with this centrifugal clutch is frictional induced hysteresis. Friction acting upon the springs and weights causes the clutch to engage at one speed yet disengage at another speed. Typically, the frictional induced hysteresis causes the clutch to engage at a higher speed but disengage at a lower speed. Preferably, the engagement and disengagement speeds are substantially equivalent to one another, allowing for smoother operation of the centrifugal clutch when used on motorized vehicles such as racing karts. Additionally, adjusting the springs to achieve different engagement speeds is difficult, imprecise, and cumbersome.

What is needed, therefore, is a centrifugal clutch which is kinematically simpler so as to minimize frictional induced hysteresis during its operation to provide a centrifugal clutch with substantially equivalent engagement and disengagement speeds. This clutch should also be less complicated, less expensive, and relatively lightweight. Finally, the springs such be designed to be relatively simple to adjust and replace in order to allow for efficient adjustment of the engagement speed.

SUMMARY OF THE INVENTION

The present invention is directed to a kinematically simple centrifugal clutch which minimizes frictional induced hysteresis. The centrifugal clutch also provides an efficient and precise manner to adjust the clutch's engagement speed. To that end and in accordance with the principles of the present invention, the centrifugal clutch includes a rotatable output driven member, at least one drive plate, and at least one clutch disc disposed adjacent to the drive plate. The clutch disc is mounted for rotation with the driven member. A drive hub is adapted to receive a rotational input such as that from an output shaft of a motor. The drive hub is mounted for rotation with the drive plate. At least one weighted member is pivotally mounted to the drive hub. The weighted member has at least two adjustment holes. At least one spring member is operative between the drive hub and the weighted member to bias the weighted member to a normally disengaged position relative to the drive plate. The spring member has one end selectively movable between the two adjustment holes. Various types of spring members, such as torsion springs or extension springs, could be utilized. Under the influence of centrifugal force generated by the rotation of the drive hub, the weighted member pivots against the resistance of the spring member so as to engage the drive plate and thereby urge the drive plate into engagement with the clutch disc to rotate the driven member in unison with the rotating drive hub. As the rotational speed of the drive hub decreases, the centrifugal force is overcome by the restoring force of the spring member and the weighted member pivots out of engagement with the drive plate, causing the drive plate to disengage the clutch disc. Consequently, the driven member is no longer actively driven by the clutch disc. The restoring force of the spring member can be adjusted by moving the end of the spring to a different adjustment hole in the weighted member.

In one embodiment, the drive hub also includes at least two adjustment holes associated with the spring. As such, the other end of the spring member is selectively movable between the adjustment holes in the drive hub. Consequently, the restoring force of the spring member can be adjusted by moving the respective ends of the spring between the adjustments holes in the weighted member and the drive hub.

In another embodiment, the centrifugal clutch includes at least two weighted members. Instead of each weighted member having at least to adjustment holes, each weighted member includes at least two adjustment slots. The centrifugal clutch further includes a garter spring that is coupled between one of the two adjustment slots of each of the weighted members to bias each weighted member to a disengaged position. The bias force exerted by the garter spring can be adjusted by moving the garter spring to a different adjustment slot in each of the weighted members.

Although the centrifugal clutch of the present invention may be used in applications requiring a clutch mechanism intermediate to a drive motor and a drive wheel, it is specifically adapted for application in motorized carts, especially racing karts.

The invention also contemplates a method for adjusting the engagement speed of a centrifugal clutch. During the operation of the centrifugal clutch, the clutch engages at a given rotational speed as determined by several factors one of which is the spring constant of the spring members. All things being equal, the engagement speed increases proportionally with the spring constant. Therefore, the engagement speed can be adjusted by replacing the existing spring members with spring members having different a spring constant. Under this method, the engagement speed is altered by changing the spring members as opposed to providing the clutch with adjustment holes in the weighted member, the drive, or both.

Various additional advantages, objects and features of the invention will become more readily apparent to those of ordinary skill in the art upon consideration of the following detailed description of the presently preferred embodiments taken in conjunction with the accompanying drawings.

DETAILED DESCRIPTION OF THE DRAWINGS

FIG. 6A is perspective view showing an alternate spring arrangement;

FIG. 6B is a partial cross-sectional view showing another spring arrangement;

FIG. 6C is partial cross-sectional view showing still another spring arrangement.

DETAILED DESCRIPTION OF PREFERRED EMBODIMENTS

Figure 1:
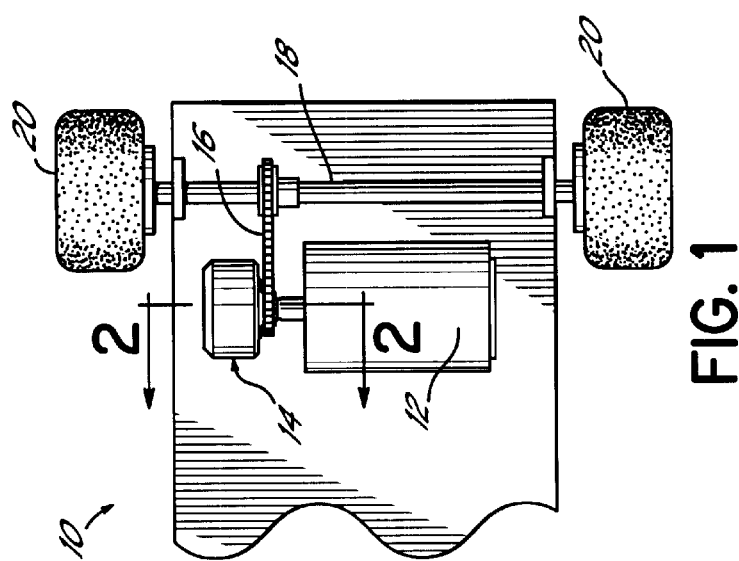
FIG. 1 is a bottom plan view of a vehicle including a centrifugal clutch according to the principles of the present invention.

Referring first to FIG. 1, a vehicle 10, such as a motorized cart, includes a motor 12 connected to a centrifugal clutch 14 of the present invention for transmitting rotation via a drive chain 16 to a drive shaft 18 for driving wheels 20.

Referring now to FIGS. 2–5, the centrifugal clutch 14 of the present invention is shown in more detail. More particularly, the centrifugal clutch 14 comprises a drum or housing 30 to which is attached an output sprocket 32 for accepting the chain 16 (FIG. 1). A drive shaft 34 includes a necked down portion 36 which extends into the centrifugal clutch 14. Bearing 38 having an inner race 40 supported by the necked down portion 36 allows the drive shaft 34 to rotate independently of the drum 30. Retaining rings 42, 44 cooperate respectively with washers 46, 48 to secure the inner race 40 within bearing 38. The sprocket includes peripheral members 52, 54 having grooves 56, 58, respectively. The peripheral members 52, 54 are fitted respectively into slots 60, 62 so that the sprocket 32 and the drum 30 rotate in unison. Retaining ring 64 inserted in grooves 56, 58 cooperates with lip 70 to secure sprocket 32 to drum 30.

The centrifugal clutch 14 further includes a clutch disc 80 which includes tabs 82. The clutch disc 80 is interleaved between two drive plates 84, 86. Screws 88 are inserted through holes 90 of drive plate 84 to secure drive plate 84 to drive hub 92. Spacers 94 (FIGS. 2, 3) fixedly space drive plate 84 away from drive hub 92. Drive plate 86 is rotated relative to drive plate 84 such that the screws 88 do not pass through holes 95 of drive plate 86 but through open areas 96. Consequently, drive plate 86 rotates in unison with drive plate 84 and drive hub 92, but is able to translate axial relative to drive plate 84 and drive hub 92 along spacers 94. It can be appreciated that additional clutch discs 80 could be used in the centrifugal clutch 14. For each additional clutch disc 80 added, an additional drive plate 86 is added with the additional clutch disc 80 interleaved therebetween. Additional clutch discs 80 may be required when a relatively large amount of torque is to be transmitted from the motor 12 to the wheels 20.

Figure 4:
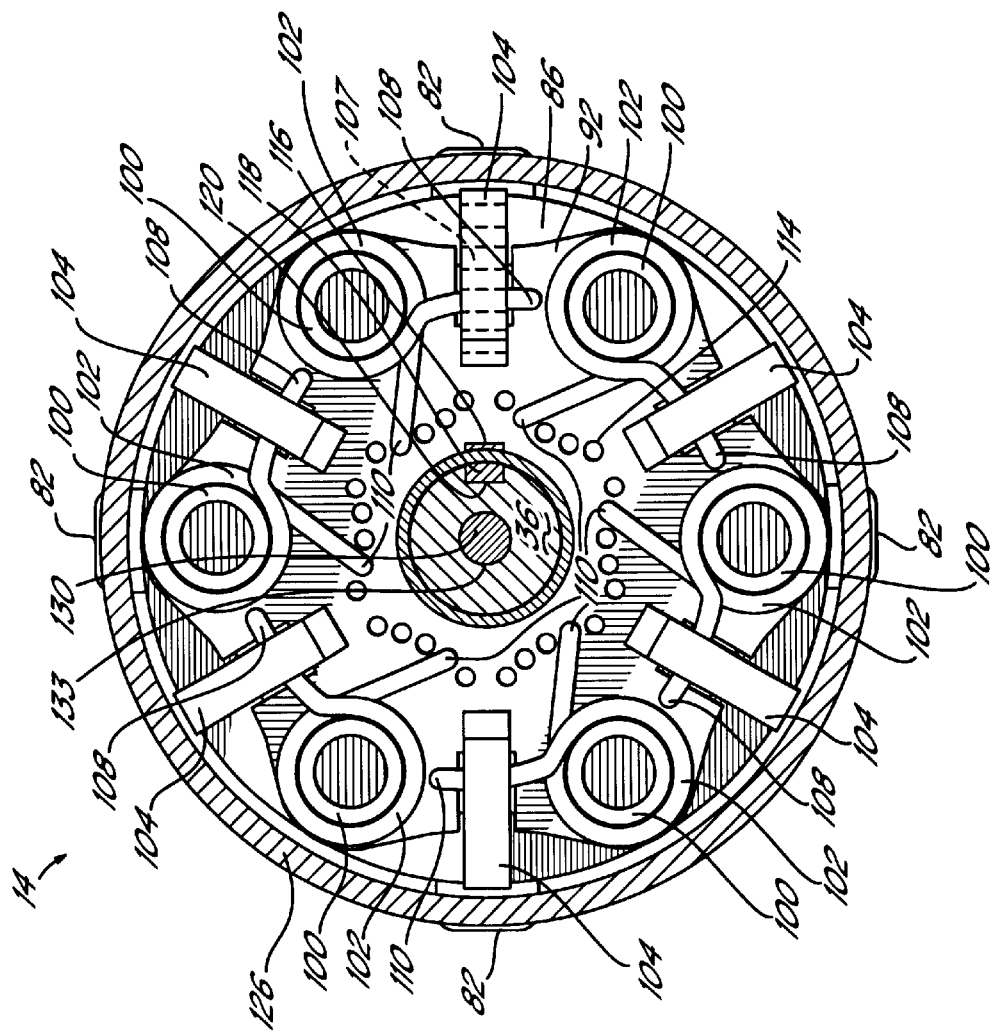
FIG. 4 is a cross-sectional view taken along line 4—4 of FIG. 3.
Figure 3:
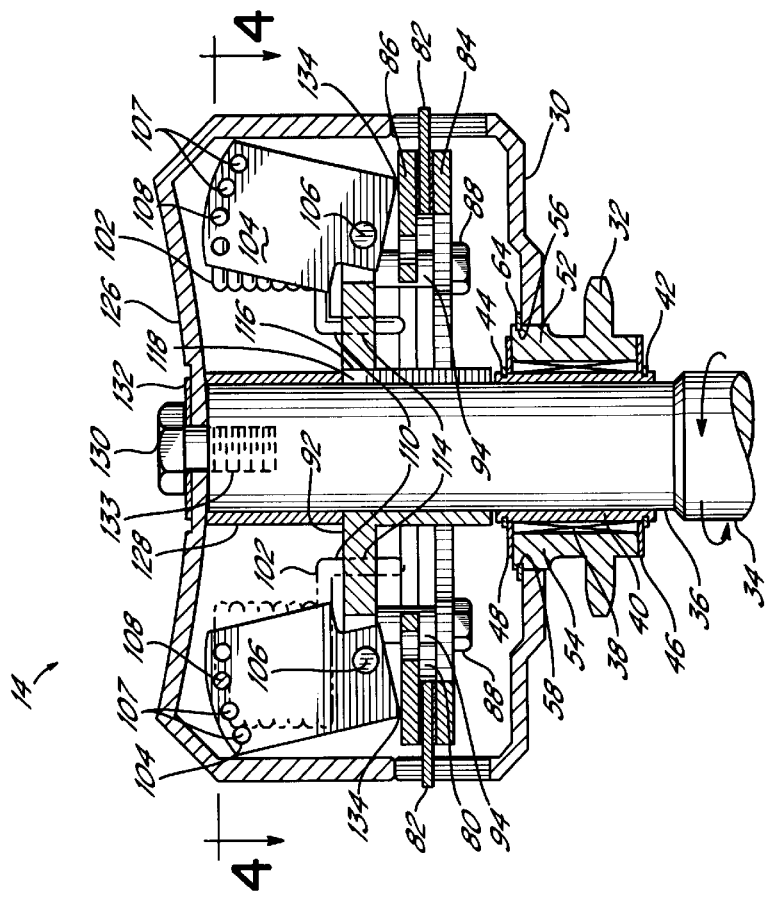
FIG. 3 is a view similar to FIG. 2 illustrating the clutch engaged.
Figure 2:
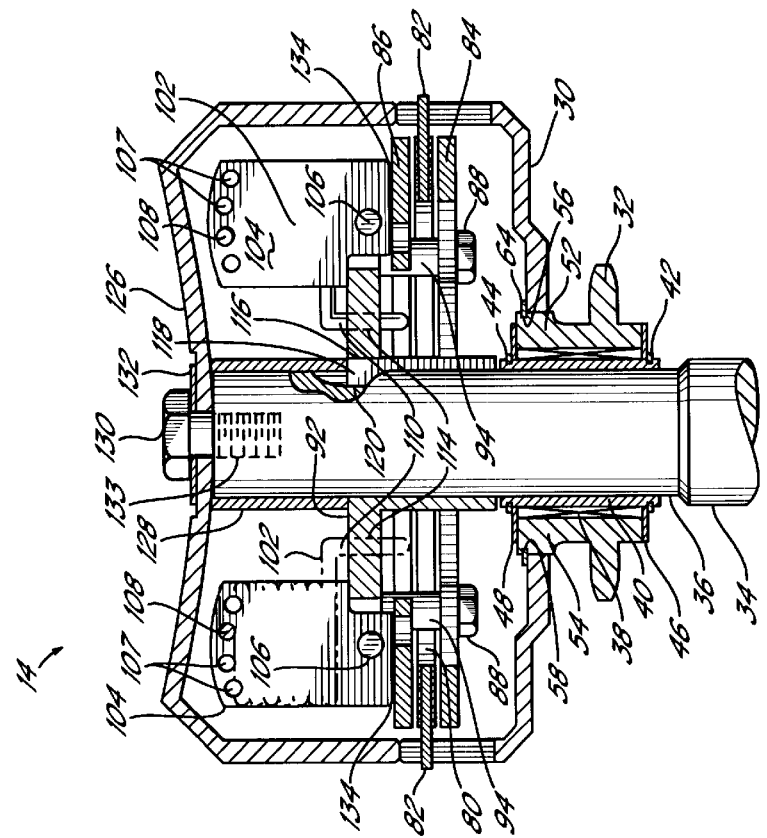
FIG. 2 is a cross-sectional view taken along line 2—2 of the clutch of FIG. 1.

Drive hub 92 includes a plurality of attachment posts or spring towers 100 equally spaced about the drive hub 92. Torsion springs 102 are concentrically mounted on each spring tower 100. Weighted members or levers 104 are pivotally attached to drive hub 92 with dowel pins 106. Each weighted member 104 includes a plurality of spaced-apart adjustment holes 107 located along one edge of the weighted member 104. Torsion springs 102 have first and second ends 108, 110. The first end 108 of torsion spring 102 is placed within one of the several adjustment holes 107 in weighted member 104 (FIGS. 2 and 3). The second end 110 of torsion spring 102 is placed within one of the several adjustment holes 114 in drive hub 92 (FIG. 4). The first and second ends 108, 110 may be selectively placed in any of the adjustment holes 107, 114 in order to alter the restoring force that the torsion spring 102 exerts on the weighted member 104. Although the centrifugal clutch 10 has been described with adjustment holes 107, 114 in both the weighted member 104 and the drive hub 92, the centrifugal clutch 10 may contain adjustment holes 107 in only the weighted members 104 or, alternatively, weighted members 114 only in drive hub 92. The drive hub 92 further includes a keyway 116. Keyway 116 cooperates with key 118 and keyway 120 of necked down portion 36 such that the drive hub 92 rotates in unison with drive shaft 34.

A cover 126 concentrically abuts drum 30 to enclose the operational structure of the centrifugal clutch 14, protecting it from foreign debris which may damage or destroy it. A spacer 128 is positioned between the interior of the cover 126 and the drive hub 92. The cover 126 is secured to the end of the drive shaft 34 with bolt 130 and washer 132. The bolt 130 is threaded into a threaded opening 133 in the necked down portion 36 of drive shaft 34.

The operation of the centrifugal clutch 14 is best illustrated with respect to FIGS. 2 and 3. In FIG. 2, drive shaft 34 is not rotating. Accordingly, each weighted member 104 is held by torsion spring 102 in a non-pivoted position. As such, the drive plate 86 is still free to move axially along the spacers 94. As the drive shaft 34 begins to rotate, the drive hub 92 and drive plates 84 and 86 rotate as well. However, because drive plate 84 is spaced away from drive hub 92 and drive plate 86 is free to move along spacers 94, the clutch disc 80 does not rotate in unison with the drive plates 84, 86. Consequently, the drum 30 and the sprocket 32 do not turn, and hence the vehicle 10 does not move.

As the rotational speed of the drive shaft 34 increases and as illustrated in FIG. 3, the centrifugal force experienced by the weighted members 104 cause the weighted members 104 to pivot about dowel pins 106. Corner section 134 of weighted member 104 engages drive plate 86 and urges drive plate 86 into engagement with clutch disc 80. When the rotational speed of drive shaft 34 and drive hub 92 reach a predetermined speed, commonly referred to as the engagement speed, the weighted members 104 pivot sufficiently such that the drive plates 84, 86 fully engage clutch disc 80. Accordingly, the clutch disc rotates drum 30 and sprocket 32 and the vehicle 10 is propelled forward. As the rotational speed decreases the centrifugal force is reduced and the torsion springs 102 act to reduce the engagement force the weighted members 104 exert on the drive plates 84, 86. At a predetermined speed, commonly referred to as the disengagement speed, the weighted members 104 disengage drive plates 84, 86 such that the clutch disc 80 no longer rotates in unison with drive shaft 34 and drive hub 92.

Consequently, the vehicle is no longer actively propelled forward. As mentioned above, first and second ends 108, 110 of torsion spring 102 can be repositioned in adjustment holes 107, 114 so that the restoring force can be changed. As the restoring force is reduced, the engagement speed is correspondingly reduced. That is, with reduced restoring force acting on the weighted members 104, less rotational speed is required to engage the clutch disc 80 and propel the vehicle 10 forward.

It can be appreciated that the torsion springs 102 could be replaced by any suitable resilient member adapted to apply a tension, compression, or torsion force between the weighted members 104 and the drive hub 92 to bias the weighted members 104 to a non-engaging position. In addition to the torsion spring 102, the resilient member may be an extension spring, a garter spring, or a leaf spring, for example. The resilient member may also be an elastic band, such as a rubber band.

With specific reference to FIG. 6A, an extension spring 136 with first and second ends 138, 140 is connected between the weighted member 104 and an attachment lug 141. More specifically, first end 138 of extension spring 136 is removably inserted into one of a plurality of spaced-apart adjustment holes 107 in the weighted member 104, and second end 140 is removably inserted into one of the adjustment holes 142 in attachment lug 141. The restoring force of extension spring 136 may be altered by selectively changing which adjustment holes 107, 142 the first and second ends 138, 140 are placed. With reference to FIG. 6B, a torsion spring 144 with first and second ends 146,148 is mounted concentrically about dowel pin 106. The first end 146 of the torsion spring 144 is fixedly held by lug 150 extending from drive hub 92. The second end 148 is removably inserted into one of the adjustment holes 107 in weighted member 104. The torsion spring 144 exerts a restoring force on weighted member 104 as it pivots under the influence of centrifugal force. The amount of restoring force can be changed by moving the second end 140 of torsion spring 144 to a different adjustment hole 107 in weighted member 104.

A slightly different spring arrangement is illustrated in FIG. 6C. In this arrangement, the weighted members 104 include a plurality of spaced-apart, outwardly-facing slots 152. A garter spring 154 is placed into one of the plurality of slots 152 in each of the six weighted members 104. Preferably, the garter spring 154 is placed into concentrically aligned slots 152 so that the garter spring 154 exerts an equal restoring force to each of the weighted members 104. In this particular embodiment, the garter spring 154 is indirectly operative between the drive hub 92 and the weighted members 104. That is to say, the garter spring 154 relies on the interaction between individual weighted members 104 and drive hub 92 to produce a restoring force. In addition to moving the garter springs 154 between slots 152 to alter the restoring force, garter springs 154 with different spring constants could be utilized to change the restoring force and thus, the engagement speed.

Generally, the restoring force of a spring is equal to the product of the spring constant multiplied by the change in length of the spring, usually referenced from its unstretched position. In each of the embodiments described above, the restoring force was altered by changing the length component of the restoring force equation. That is, by changing which adjustment holes the ends of the springs engage, the length of the spring can be altered, thereby changing the restoring force the spring exerts on the weighted member. The restoring force could also be altered by altering the spring constant of the spring.

Figure 5:
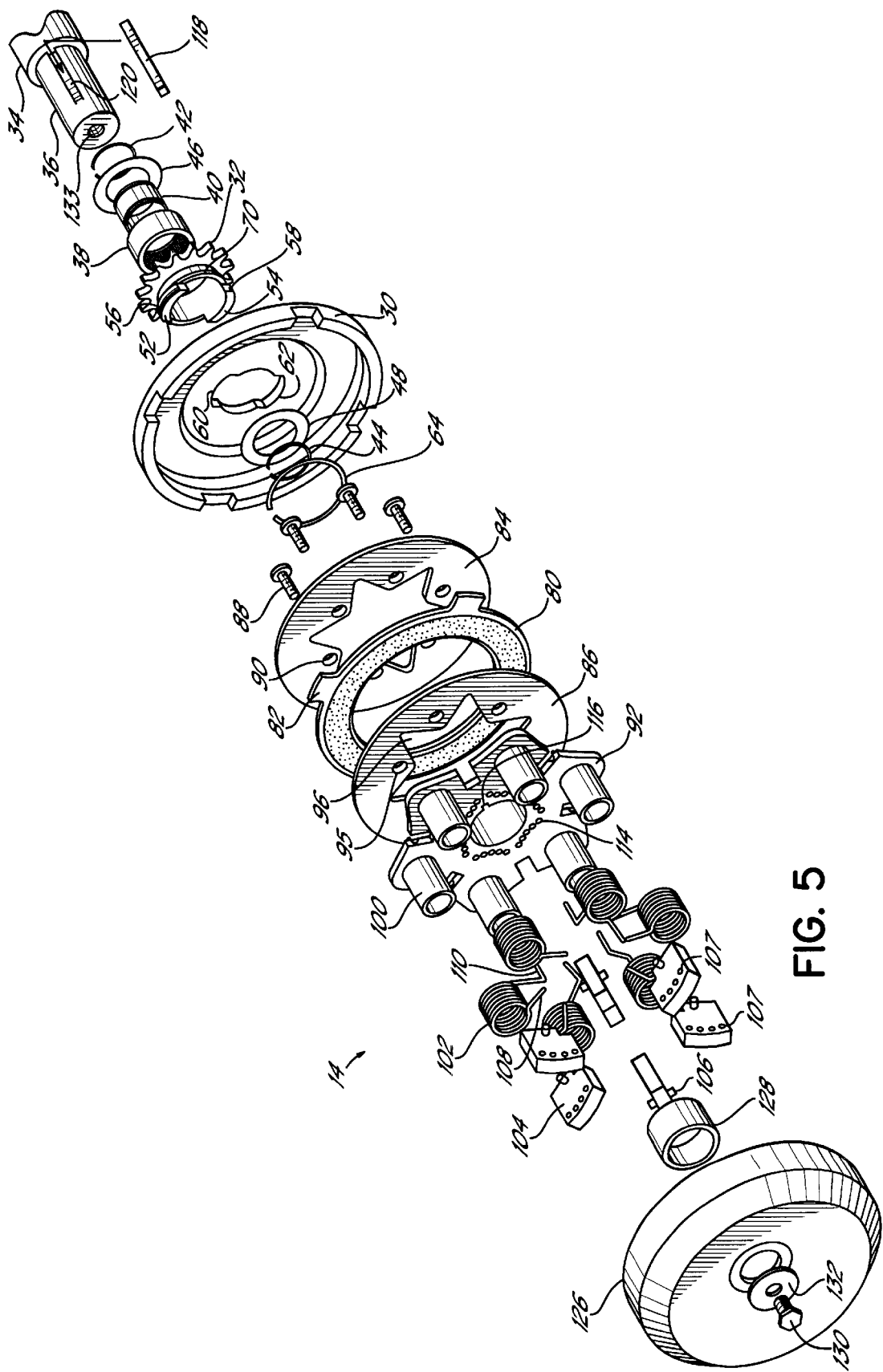
FIG. 5 is an exploded perspective of the clutch of FIGS. 2–4.
Figure 7:
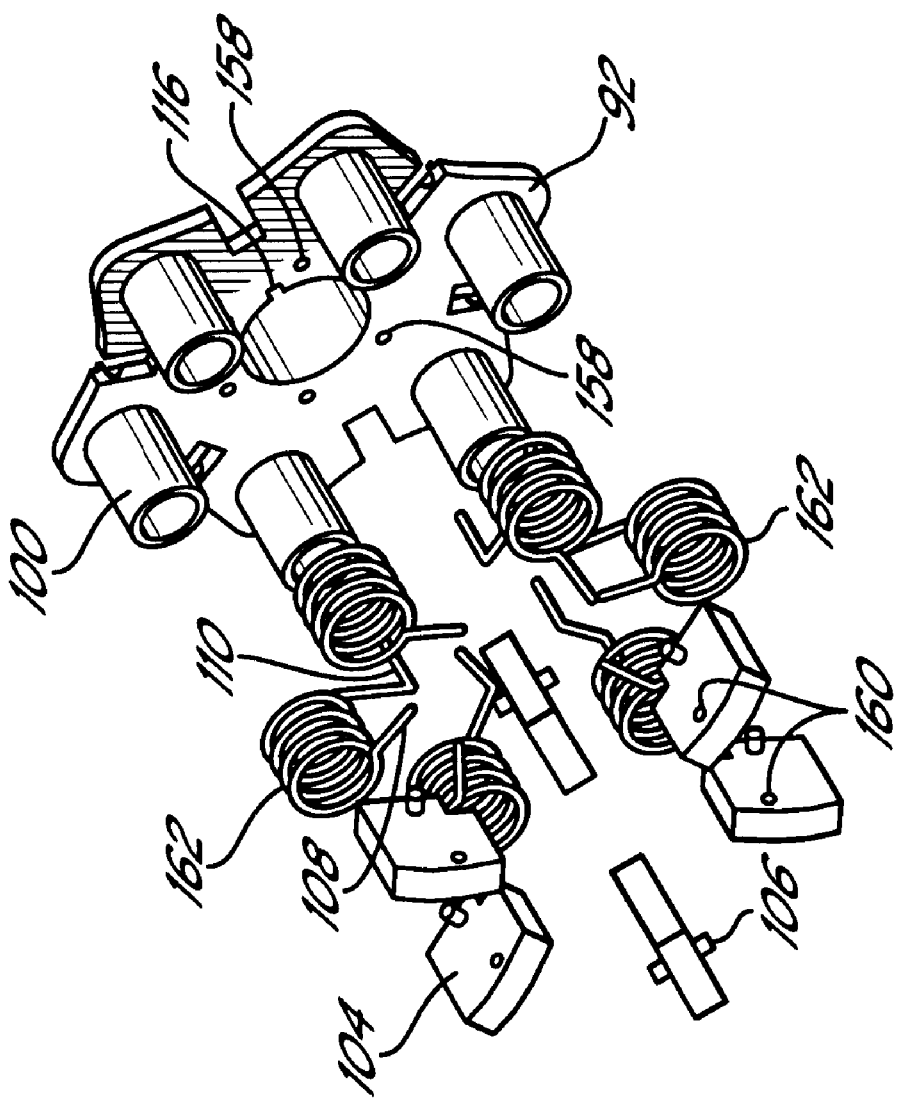
FIG. 7 is an exploded partial perspective view of another embodiment of the clutch of FIG. 5.

The spring constant of a given spring is not readily changed. Consequently, to change the restoring force without using the adjustment holes described above, springs having one spring constant must be replaced with other springs having a different spring constant. As illustrated in FIG. 7, the drive hub 92 and the weighted members 104 include only one spring retention hole 158, 160, respectively. As such, to change the restoring force, the torsion springs 102 described in connection with FIGS. 25 5, is replaced with torsion springs 162 having a different spring constant. As illustrated in FIG. 7, the torsion spring 162 is not as tightly wound as torsion spring 102 illustrated in FIG. 5. All things being equal, the spring constant of torsion spring 162 is less than that of torsion spring 102. Accordingly, the restoring force for torsion spring 162 will be less than for torsion spring 102.

While the present invention has been illustrated by a description of various preferred embodiments and while these embodiments have been described in considerable detail in order to describe the best mode of practicing the invention, it is not the intention of the applicants to restrict or in any way limit the scope of the appended claims to such detail. Additional advantages and modifications within the spirit and scope of the invention will readily appear to those skilled in the art. The invention itself should only be defined by the appended claims, wherein

I claim:

1. A centrifugal clutch comprising:

a rotatable output driven member;

at least one drive plate;

at least one clutch disc disposed adjacent to said drive plate, said clutch disc mounted for rotation with said driven member;

a drive hub adapted to receive a rotational input and mounted for rotation with said drive plate;

at least one weighted member pivotally mounted to said drive hub, said weighted member having at least two adjustment holes; and at least one spring member operative between said drive hub and said weighted member to bias said weighted member to a normally disengaged position relative to said drive plate, said spring member having a first end selectively movable between said adjustment holes in said weighted member;

wherein rotation of said drive hub causes said weighted members to pivot by centrifugal force against said spring member to an engaged position thereby urging said drive plate into engagement with said clutch disc such that said driven member rotates with said drive plate.

2. The centrifugal clutch of claim 1 wherein said at least one spring member comprises two spring members, said at least one weighted member comprises two weighted members, said at least one drive plate comprises two drive plates and said drive hub includes at least one pair of attachment posts, said spring members are torsion springs mounted concentrically about said attachment posts.

3. The centrifugal clutch of claim 2 comprising six attachment posts, six torsion springs, and six weighted members each having at least four adjustment holes.

4. The centrifugal clutch of claim 1, wherein said drive hub further includes at least two adjustment holes associated with said spring, said spring member having a second end selectively movable between said adjustment holes in said drive hub.

5. The centrifugal clutch of claim 1 wherein said at least one spring member comprises two spring members, said at least one weighted member comprises two weighted members, said at least one drive plate comprises two drive plates and said drive hub includes at least a one pair of attachment lugs, said spring members are extension springs operatively connected between said attachment lugs and said adjustment holes of said weighted members.

6. The centrifugal clutch of claim 5 wherein each of said attachment lugs includes at least two adjustment holes, said extension springs being operative between said adjustment holes in said weighted members and said adjustment holes in said attachment lugs.

7. The centrifugal clutch of claim 1 wherein said weighted member is rotatably mounted to said drive hub using a pin, said spring member is a torsion spring mounted concentrically about said pin to bias said weighted member to a disengaged position relative to said drive plate.

8. A centrifugal clutch comprising:
   a rotatable output driven member;
   at least one drive plate;
   at least one clutch disc disposed adjacent to said drive plate, said clutch disc mounted for rotation with said driven member;
   a drive hub adapted to receive a rotational input and mounted for rotation with said drive plate;
   two weighted members pivotally mounted to said drive hub, each of said weighted member having at least two adjustment slots; and
   a garter spring coupled between one of said two adjustment slots of each of said weighted members to thereby bias said each of said weighted members to a normally disengaged position relative to said drive plate;
   wherein rotation of said drive hub causes said weighted members to pivot by centrifugal force against said garter spring to an engaged position thereby urging said drive plate into engagement with said clutch disc such that said driven member rotates with said drive plate.

9. A motorized vehicle having a motor, at least one drive wheel, and a centrifugal clutch operative between the motor and the drive wheel to transfer rotational output from the motor to the drive wheel to propel the motorized vehicle, the centrifugal clutch comprising:
   a rotatable output driven member operatively connected to said drive wheel;
   at least one drive plate;
   at least one clutch disc disposed adjacent to said drive plates, said clutch disc mounted for rotation with said driven member;
   a drive hub adapted to receive a rotational input from said motor and mounted for rotation with said drive plate;
   at least one weighted member pivotally mounted to said drive hub, said weighted member having at least two adjustment holes; and
   at least one spring member operative between said drive hub and said weighted member to bias said weighted member to a normally disengaged position relative to said drive plate, each spring having an end selectively movable between said adjustment holes in said weighted member;
   wherein said rotational input from said motor rotates said drive hub causing said weighted members to pivot by centrifugal force against said spring member to an engaged position thereby urging said drive plate into engagement with said clutch disc such that said driven member operatively rotates said drive wheel.

10. The motorized vehicle of claim 9 wherein said at least one spring member comprises two spring members, said at least one weighted member comprises two weighted members, said at least one drive plate comprises two drive plates and said drive hub includes at least one pair of attachment posts, said spring members are torsion springs mounted concentrically about said attachment posts.

11. The motorized vehicle of claim 9 wherein said at least one spring member comprises two spring members, said at least one weighted member comprises two weighted members, said at least one drive plate comprises two drive plates and said drive hub includes at least a one pair of attachment lugs, said spring members are extension springs operatively connected between said attachment lugs and said weighted members.

12. The motorized vehicle of claim 9 wherein said weighted member is rotatably mounted to said drive hub using a pin, said spring member is a torsion spring mounted concentrically about said pin to bias said weighted member to a disengaged position relative to said drive plate.

* * * * *